United States Patent [19]
Kenning et al.

[11] Patent Number: 5,537,667
[45] Date of Patent: Jul. 16, 1996

[54] SWIMMING TRAINING DEVICE WITH REMOVABLE RECEIVER DISPOSED THEREIN

[76] Inventors: Peggy J. Kenning; John G. Kenning, both of 4907 Riverside Dr., Coral Springs, Fla. 33067

[21] Appl. No.: 182,796

[22] Filed: Jan. 14, 1994

Related U.S. Application Data

[63] Continuation-in-part of Ser. No. 976,527, Nov. 16, 1992.

[51] Int. Cl.⁶ .................................................. H04R 1/02
[52] U.S. Cl. .............................. 381/88; 2/68; 381/188; 455/350
[58] Field of Search .................. 455/88, 90, 100, 455/346, 344, 350, 40, 349, 351; 381/88, 205, 90, 188, 25, 77; 2/68, 209.13

[56] References Cited

U.S. PATENT DOCUMENTS

| | | | |
|---|---|---|---|
| 2,434,251 | 1/1948 | Warnke | 381/187 |
| 3,757,220 | 9/1973 | Abel | 325/47 |
| 3,983,483 | 9/1976 | Pando | 325/16 |
| 4,321,433 | 3/1982 | King | 179/156 |
| 4,336,537 | 6/1982 | Strickland | 340/850 |
| 4,340,972 | 7/1982 | Heist | 455/39 |
| 4,357,711 | 11/1982 | Drefko et al. | 455/89 |
| 4,386,437 | 6/1983 | Fosher | 2/10 |
| 4,451,935 | 6/1984 | Henschel | 2/185 R |
| 4,524,461 | 6/1985 | Kostanty et al. | 455/79 |
| 4,607,395 | 8/1986 | Sundahl | 455/351 |
| 4,673,893 | 6/1987 | Shorkey | 331/64 |
| 4,682,363 | 7/1987 | Goldfarb et al. | 381/74 |
| 4,727,599 | 2/1988 | Rappaport et al. | 455/351 |
| 4,833,726 | 5/1989 | Shinoda et al. | 455/89 |
| 4,885,797 | 12/1989 | Leather et al. | 455/40 |
| 5,117,464 | 5/1992 | Jones et al. | 381/183 |
| 5,119,505 | 6/1992 | Tisseront et al. | 455/89 |
| 5,142,700 | 8/1992 | Reed | 455/344 |
| 5,410,746 | 4/1995 | Gelber | 455/344 |

FOREIGN PATENT DOCUMENTS 2121649  12/1983  United Kingdom.

Primary Examiner—Curtis Kuntz
Assistant Examiner—Ping W. Lee
Attorney, Agent, or Firm—Weintraub DuRoss & Brady

[57] ABSTRACT

A swimming training device having a swimming cap removably contained therein a receiving device. The receiving device can pickup one of a multiple of signals from a transmitter controlled by a swimming coach. The cap has a compartment that can be sealed releasably, so that water is kept out during swimming and the device may be accessed for repairs or removal.

11 Claims, 5 Drawing Sheets

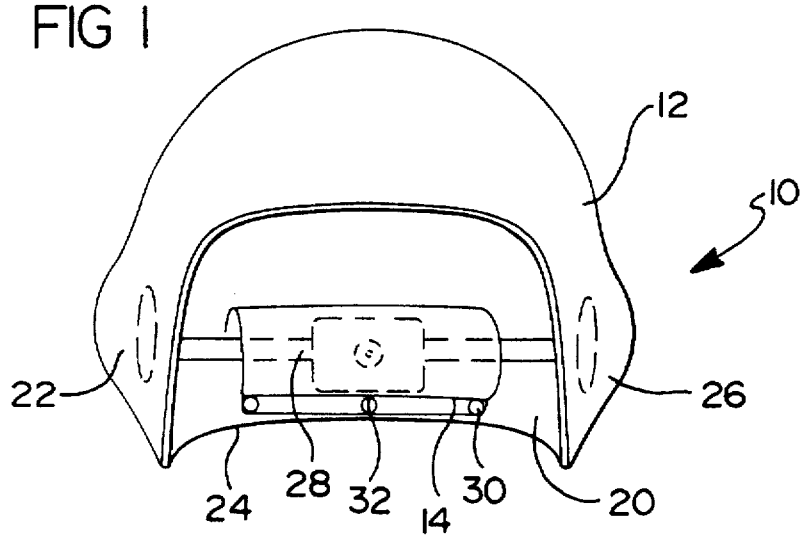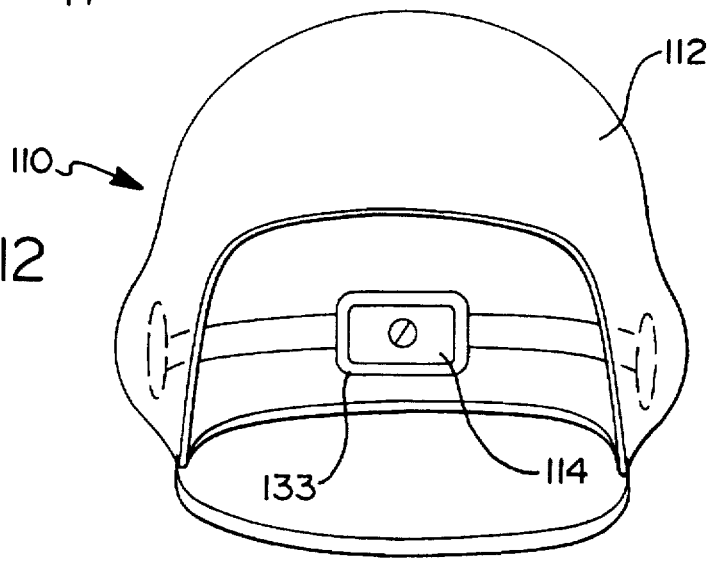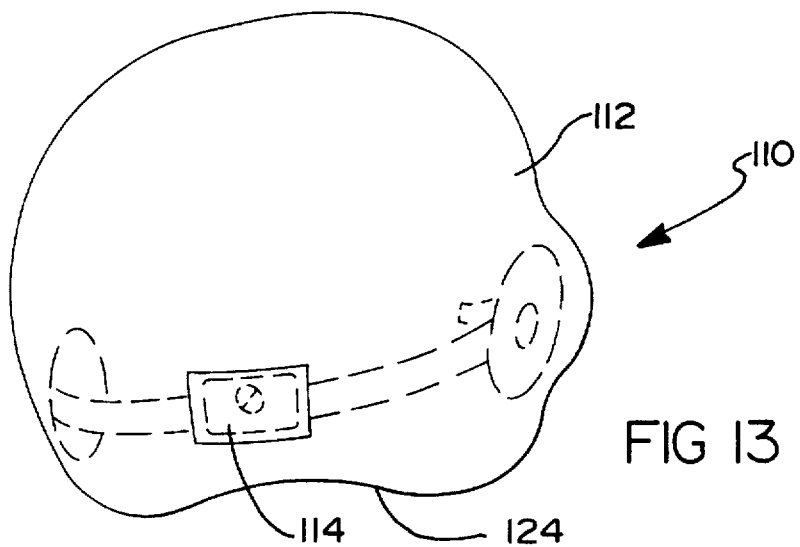

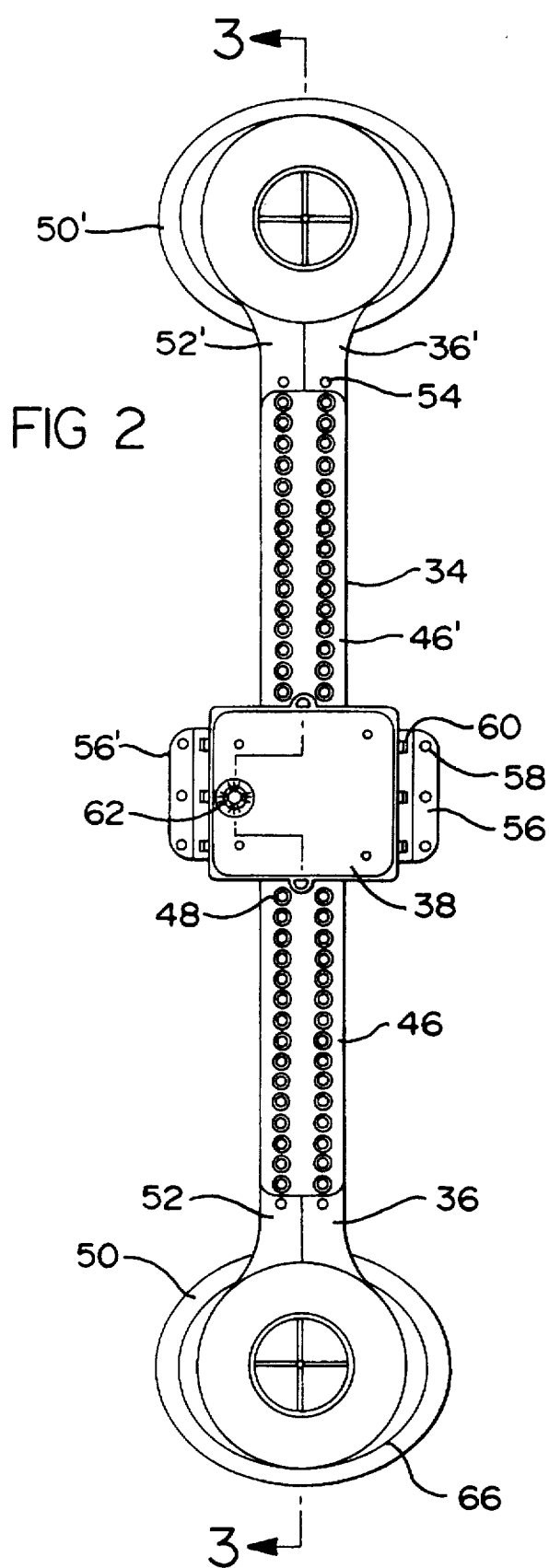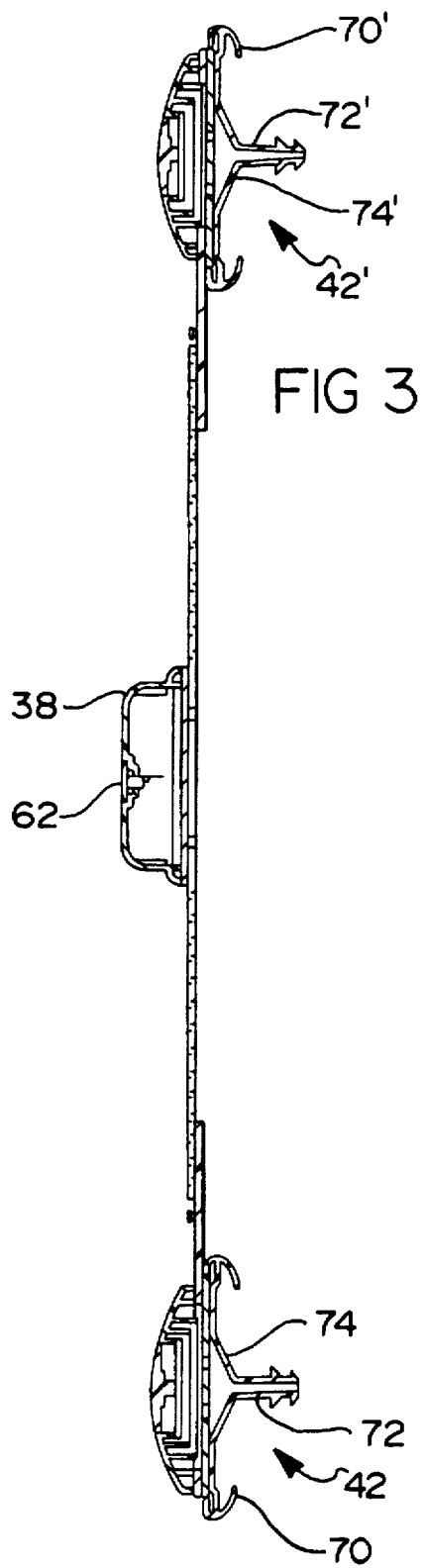

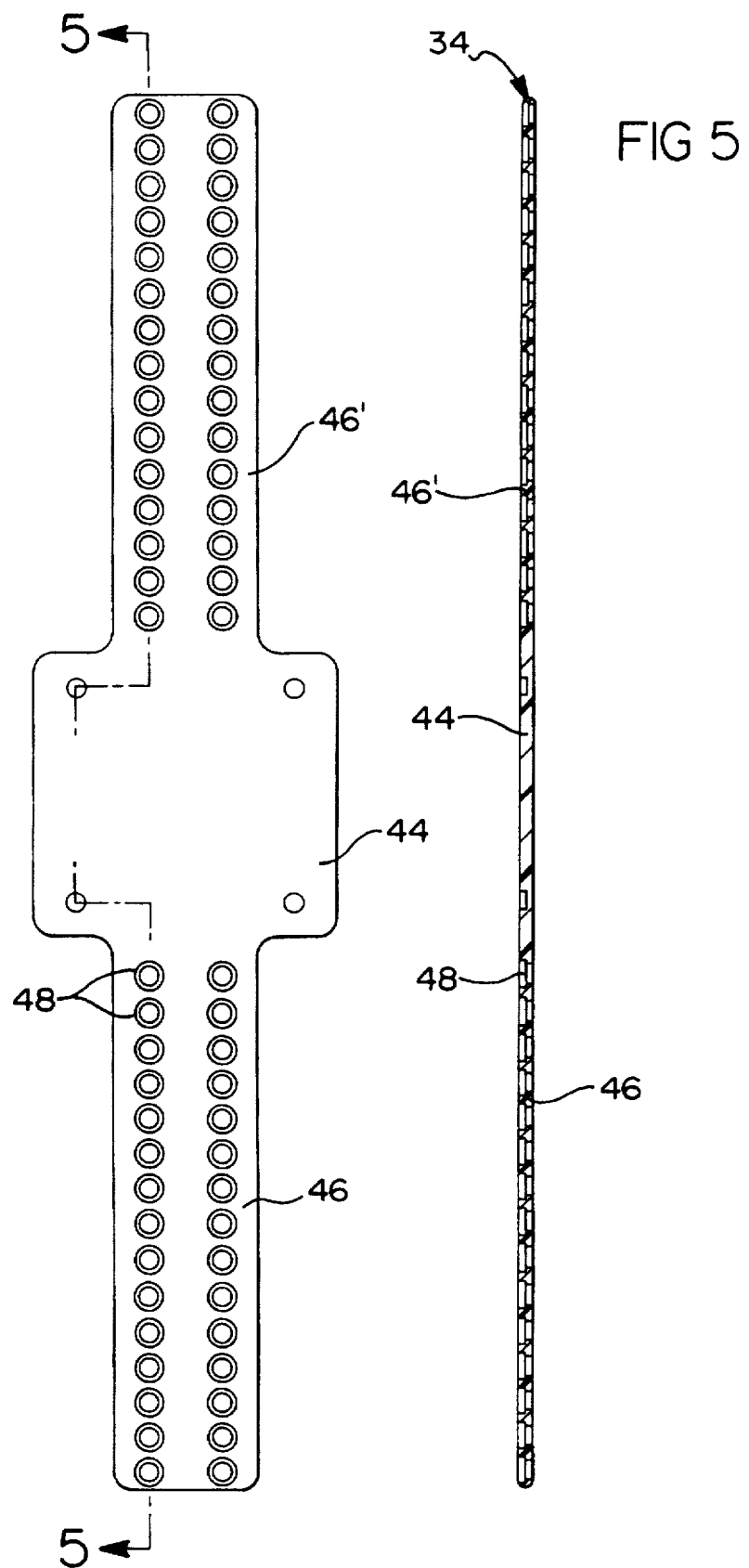

FIG 10
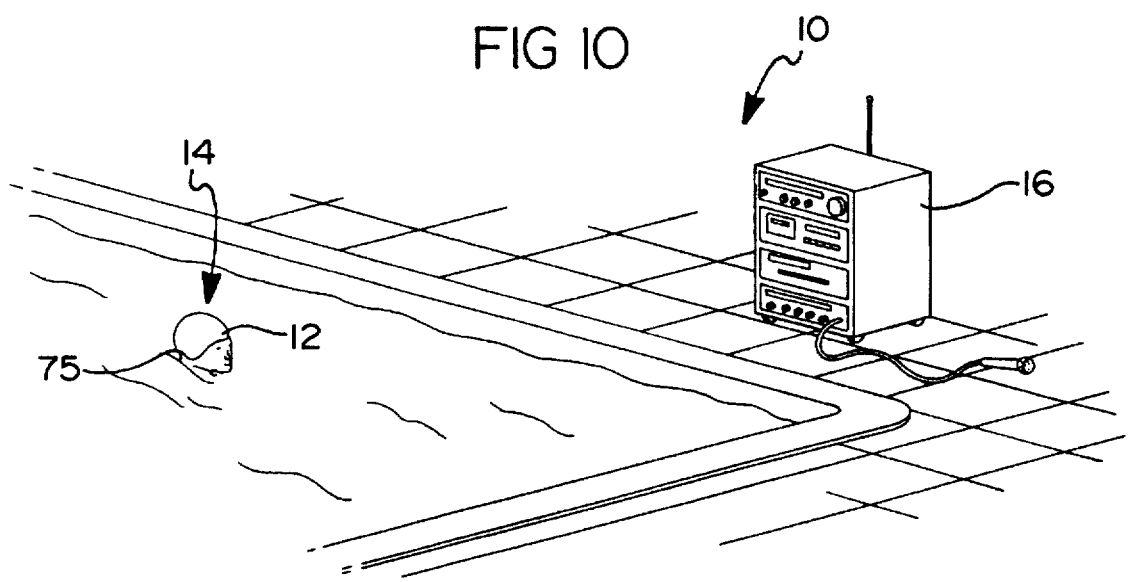
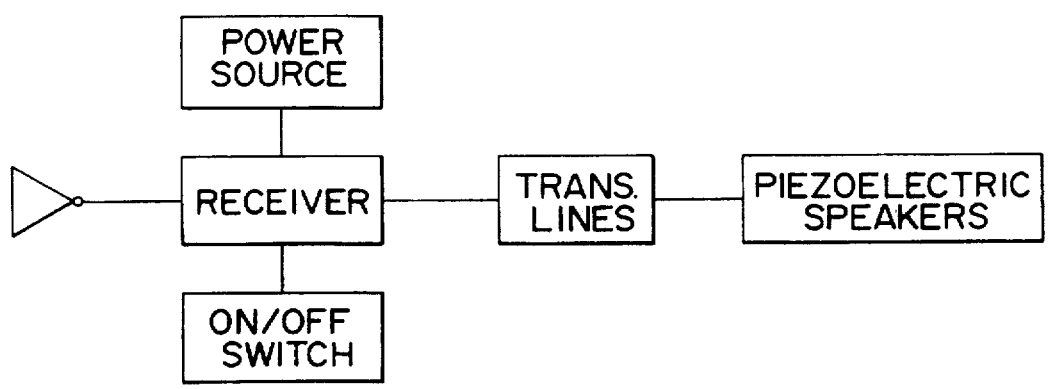
FIG 11

SWIMMING TRAINING DEVICE WITH REMOVABLE RECEIVER DISPOSED THEREIN

CROSS-REFERENCE TO RELATED APPLICATIONS

This application is a continuation-in-part of U.S. patent application Ser. No. 07/976,527, filed Nov. 16, 1992, which is hereby incorporated by reference into the present application.

BACKGROUND OF THE INVENTION

1. Field of the Invention

The present invention concerns a swimming cap having an electromagnetic wave receiving device therein. More particularly, the present invention concerns a swimming cap wherein the receiving device is removable from and adjustable within the cap.

2. Prior Art

Heretofore, swimmers in competitive training have suffered from a handicap not encountered by their counterpart land athletes. The handicap is the lack of interactive contact between a coach and an athlete during training. While training, the coach must yell instructions to the swimmer, with no surety that the athlete will hear the instructions. The situation leads to much frustration, strained vocal chords and poor training.

An additional problem incurred by swimmers in training is boredom. To build stamina, swimmers must spend many hours swimming multiple laps. Without a changing scenery or other stimulus, the swimmer only concentrates on the training and the exertion occurring. To alleviate this situation, some type of audio entertainment is desired.

One attempt to provide audible entertainment to a swimmer is described in U.S. Pat. No. 4,682,363, issued Jul. 21, 1987 to Goldfarb et alia and entitled "AMPHIBIOUS AUDIO SYSTEM". Goldfarb teaches an apparatus to provide radio or taped broadcasts to recreational swimmers, the apparatus comprising a band which encircles the head of a swimmer. The apparatus further comprises means for receiving public radio signals and means for converting the signals to audible sounds. Speakers sealed within ear plugs are coupled to the converting means, thereby transmitting the public radio broadcast to the swimmer. A first container mounted to one side of the band contains a cassette tape player. A second container mounted on the opposite side of the band contains batteries therein to supply power to the system. Tuning means to select an AM/FM broadcast is also disposed along the side of the band. The band is secured on the head of the swimmer by a Velcro fastener.

Goldfarb has drawbacks is used by a competitive swimmer. Goldfarb, as noted, is intended for use by recreational swimmers. This is reflected by the Velcro fastener on the band, which could easily come undone by the swift and vigorous motions of a competitive swimmer. This would be particularly evident when a swimmer performs a flip-kick to change directions. The Goldfarb apparatus would likely come undone, and thus inhibit practice. In this circumstance, Goldfarb could not accomplish its intended purpose.

Secondly, the Goldfarb device is not properly weight-balanced on the head of the swimmer. By placing the battery and cassette compartments on the sides of the headband, pressure is brought on the head to rotate. Additionally, the compartments would cause drag within the water. This would reduce the speed of the swimmer.

Finally, and most importantly, the Goldfarb device only receives radio broadcasts or plays pre-recorded tapes. This does not afford interactive communication with a coach. Rather, Goldfarb precludes this by piping a radio broadcast into the ears of the swimmer, particularly by the deployment of the speakers in ear plugs. Thus, the Goldfarb device could not be used by a swimmer during a practice where instruction is given or where distance training is desired.

A device to address the training of swimmers can be found in U.S. Pat. No. 4,885,797, issued Dec. 5, 1989 to Leather et alia and is entitled "COMMUNICATION SYSTEM". Leather et alia teach a communication system whereby an audio signal is transmitted by a coach to swimmers in a pool. The message is received only by selected swimmers, as sub-audible tones are selected and transmitted with the message. Thus, a receiver will only convert the received electromagnetic waves. Thus, a form of individualized training can be achieved with this device.

Leather, however, has some drawbacks. Firstly, Leather must be sealed within the cap. It cannot be removed for repairs or other modifications. This is stated clearly in the reference, and is substantiated by the disclosed recharging system. Secondly, Leather allows only one message to be broadcast. Leather is limited to one broadcast frequency; thus, no additional broadcasts, such as music or timing signals, can be given. Also, the swimmer has no control over the broadcast received. The instructor has total control over the messages given to a swimmer.

An additional problem with the device of Leather is the fixed nature of the cap. As noted, the receiving device of Leather is of a fixed size. Thus, caps must be fitted to each swimmer, without means of adjusting for slight misalignment. Alternately, if a swimmer has a different sized head, the cap of Leather cannot be altered for affecting proper usage by the second swimmer. Thus, a second sized cap of Leather must be obtained.

What is needed in the art is a cap capable of receiving multiple broadcast frequencies from a single transmitting source. Further, there is need in the art for a cap in which the receiving device sealed within the cap is accessible for replacement and/or regular maintenance. Additionally, a receiving device of an adjustable deployment would make caps utilizable over a range of wearer head size.

It is to the particular needs of the competitive swimmer and solving the problems of the prior art that the present invention is directed.

SUMMARY OF THE INVENTION

A training device for use in instructing swimmers, the device comprising:

(a) a swimming cap having a non-permanently sealable pouch formed therein;

(b) a band of adjustable length disposed within the pouch;

(c) a receiving unit comprising:

(1) an antenna to receive electromagnetic waves;

(2) a multi-frequency receiver which receives the waves and connects the waves to electrical signals, the receiver having means for selecting one received frequency for conversion to electircal signals;

(d) a plurality of speakers in electrical communication with the receiver, the speakers being deployed upon the band.

In the preferred embodiment, the device further comprises a battery, connected to a power on/off switch, disposed in one earpiece thereof. Additionally, a volume control is disposed within the other earpiece.

The cap of the present invention is formed, in the preferred embodiment, to include a pouch formed therein to dispose the receiving device. Alternately, a sleeve may be formed within the cap, the sleeve being accessible by a hole formed at the base of the cap.

The cap further has formed therein the ear plugs. The plugs have formed there behind a cone to funnel the sound to a wearer. Foam may be deployed around the cover to insulate the sound and direct it toward the wearer.

The present invention will be better understood by the following detailed description of the preferred embodiments understood in conjunctioin with the accompanying drawings, wherein like reference numerals refer to like elements wherein:

BRIEF DESCRIPTION OF THE DRAWINGS

FIG. 1 is a front view of a first embodiment of the swimming cap of the present invention;

FIG. 2 is a top view of a receiving device and a plurality of speakers mounted upon an adjustable band;

FIG. 3 is a side view of the receiving device an plurality of speakers mounted upon the adjustable band;

FIG. 4 is a top view of the base band of the present invention;

FIG. 5 is a side view of the base band of the present invention.

FIG. 10 is an environmental view of the swimming cap of the present invention as worn by a swimmer, with a transmitter unit deployed at poolside;

FIG. 11 is a schematic chart of the receiving device of the present invention; and FIG. 12 is a perspective view of a second embodiment of the swimming cap of the present invention.

FIG. 13 is a back view of a second embodiment of the swimming cap of the present invention.

DETAILED DESCRIPTION OF THE PREFERRED EMBODIMENTS

Figure 6:
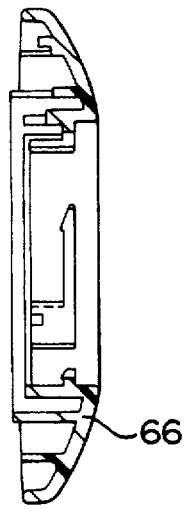
FIG. 6 is a side view of the earpiece cover of the present invention.

Referring now to FIGS. 1–11, there is seen the present invention, to wit, a swimming training device 10. The training device 10, in the first embodiment of the present invention, comprises a swimming cap 12 and means 14 for receiving electromagnetic waves from a designated transmitter 16. The training device further comprises speakers 18 for transmitting the audible sounds to the wearer.

Referring specifically to FIG. 1, the cap 12 formed of latex may be seen, in the preferred embodiment, comprising a pouch 20 formed therein. The pouch 20 extends laterally along the base of the cap, beginning at the right ear portion 22, continuing to the base 24 of the cap and terminating at the left ear portion 26. The cap 12 further comprises a flap 28. The flap 28 folds over the inside portion of the cap 12, such that the means 14 for receiving disposed within the pouch 20 is sealed water-tightly within the cap 12. The flap 28 is secured into position by a plurality of snaps 30, the snaps 30 interacting with holes 32 formed in the flap 28.

Referring now to FIG. 11, there is seen an alternate embodiment of the cap 112 of the present invention. The cap 112 is formed of silicone, and has formed therein the means 114 for receiving the electromagnetic waves. A hole 133 is formed along the base 124 of the cap 112, along the inside surface thereof. The means 114 for receiving has a portion of itself showing therethrough the hole 133. The receiver of the means 114 for receiving can then be removed from the base band thereof, if desired. It is not envisioned that the base band with speakers are to be removed from the cap. However, it could be conceivable for this to be accomplished if a wide enough hole were made in the cap. Alternately, it is envisioned that the disposition of the means 114 for receiving can be accessible from a hole formed on the back of the cap 112 as opposed to the presently formed hole 133 on the inside surface.

Referring now to FIGS. 2–10, there can be seen the means 14 for receiving the electromagnetic waves, which, in the preferred embodiment, comprise a base band 34, a pair of earpiece bands 36, 36', a receiver 38, a pair of speakers 40, 40' and a pair of earplugs 42, 42' mounted proximate the speakers 40, 40'.

The base band 34 of the means 14 for receiving is a lightweight sturdy member, ideally formed from plastic. The base band 34 comprises a central portion 44 having identical strap portions 46, 46' extending from opposite sides of the central portion 44. Each strap portion 46, 46' has a plurality of apertures 48 formed therein. The pair of earpiece bands 36, 36' are formed of material similar to the base band 34. The earpiece bands 36, 36' comprise a speaker portion 50 formed substantially in an oval or elliptical shape. Unitarily formed to the speaker portion 50 is a strap portion 52 having a plurality of studs 54 deployed therein. The studs 54 are deployed in an orientation substantially similar to the apertures 48 on the strap portion 46 of the base band 34. By this correspondence of and deployment of the studs 54 through the apertures 48, the earpiece bands 36, 36' can be attached to the base band 34.

The central portion 44 of the base band 34 has mounted therein the receiver 38, such that it is substantially occupying the entire central portion 44. As seen in FIGS. 2 and 3, a pair of attaching portions 56, 56' attached to the central portion 44. The attaching portions 56, 56' are then folded up along the side of the receiver 38, such that apertures 58 formed in the attaching portion 56, 56' thereon close around hooks 60 formed on the side of the receiver 38. This effects an attachment, which keeps the receiver 38 securely mounted thereon the base band 34.

The receiver 38 of the present invention is envisioned as an antenna deployed therein to receive the electromagnetic waves. The receiver 38 then transforms these electromagnetic waves into electrical signals by other elements commonly known. The signals are then communicated over wiring. The receiver 38 is capable of the reception of a plurality of frequencies, each frequency being elicited from a single transmitter 16. The user has the option of selecting which frequency will be listened to by use of a frequency selector or channel selector 62 built into the receiver 38.

Figure 7:
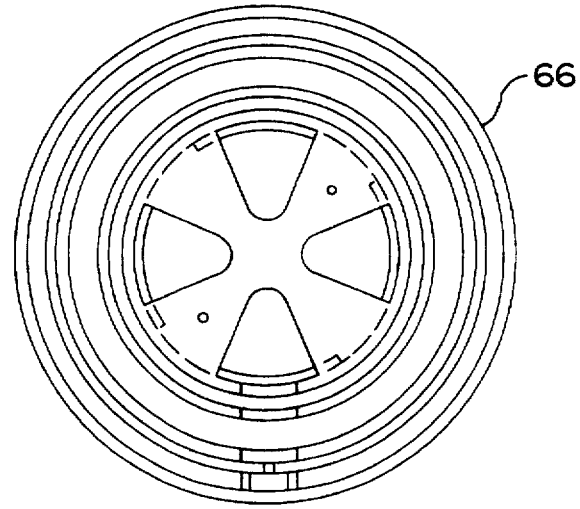
FIG. 7 is a top view of the earpiece cover of the present invention.
Figure 8:
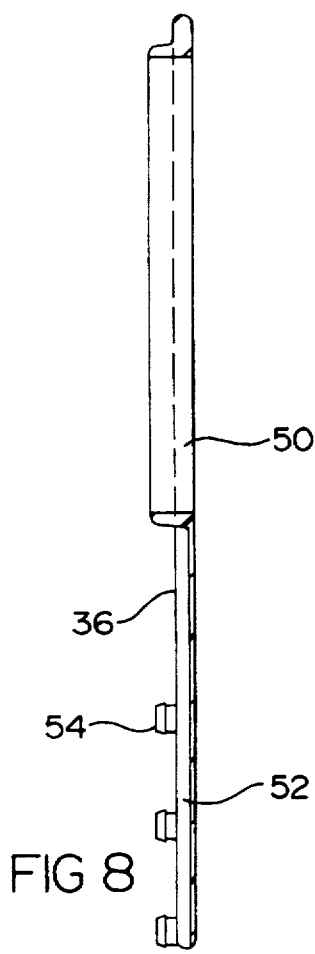
FIG. 8 is a side view of one of the earpiece bands of the present invention.
Figure 9:
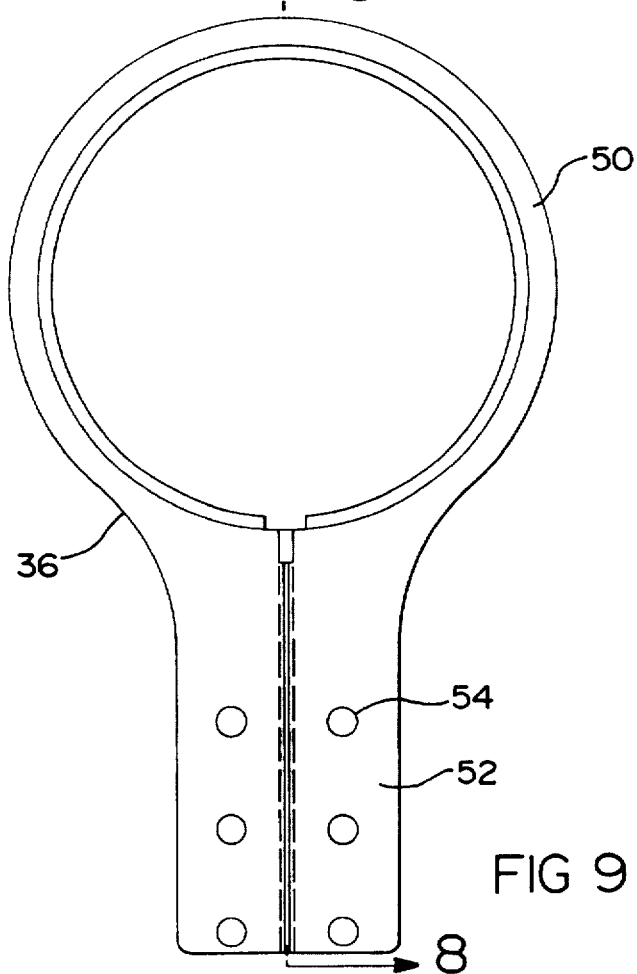
FIG. 9 is a top view of one of the earpiece bands of the present invention.

Speakers 40, 40' are mounted upon the central portions of each earpiece band 36, 36'. The speakers 40, 40' are in electrical communication with the receiver 38, such that the speakers 40, 40' receive the electrical signals produced by the receiver 38 and produce audible sounds that could be heard by a wearer, as is well known in the broadcasting arts. As seen in FIGS. 3, 6 and 7, an ear cover 66 is mounted atop each speaker 40, 40' to water tightly enclose it thereon the earpiece band 36, 36'. An earplug 42, comprising a flange member 70 and a canal member 72, is mounted to each earpiece band under the speaker. The flange member 70 surrounds the ear of a user, such that no sound may escape outside it nor may water get inside the ear. The canal portion 72 fits into the ear canal of the wearer, such that the sound is directed straight into the eardrum. Foam (not shown) may surround this canal portion 72 to aid in focusing the sound waves to the eardrum of the wearer. Additionally, a funnel 74 is formed there behind the channel, which also gathers the produced sound waves from the speaker and focuses these waves on the eardrum.

Referring particularly now to FIG. 10, there is shown therein a swimmer 75 wearing the cap 12 of the present invention. A transmitter 16 is shown pool side. The transmitter comprises a means for transmitting over a multiple number of frequencies as set out in the corresponding co-pending application. Each of these frequencies is receivable by the means 14 for receiving within the cap 12. Each frequency will have an individual broadcast dedicated thereto. For example, coaching instructions could be on one frequency, music for distance swimmers could be on a different frequencies and a metronome, or other timing device, could be on a third. The frequencies are fed through a mixing board (not shown). This facilitates an override of set programming on any frequency to broadcast a special message, such as an instructor reaching all cap wearers when the pool needs to be evacuated quickly. In an alternate embodiment, the training device of the present invention is seen to include both the cap containing means for receiving and the transmission means, i.e., the transmitter and the devices therewith.

Having thus described the invention, what is claimed is:

1. A swimming cap training device for receiving electromagnetic waves broadcast over a plurality of frequencies, the device comprising:
    (a) a cap formed of a flexible material having a sealable pouch formed along the inner surface therein;
    (b) a band of adjustable length for mounting a receiver unit thereon housed within the pouch, the band comprising:
    (i) an enlarged central portion in the pouch and configured to receive a receiver thereon; and
    (ii) a pair of attaching portions attached on opposite sides of the enlarged central portion, each of the pair of attaching portions having a plurality of apertures formed therein extending along the length thereof.

2. The swimming cap training device of claim 1 further including means for receiving electromagnetic waves, the means for receiving being mounted to the band.

3. The device of claim 2, wherein the means for receiving electromagnetic waves comprises:
    (a) an antenna to receive the electromagnetic waves;
    (b) the receiving unit in communication with the antenna, the receiving unit converting received waves into electric signals; and
    (c) at least one speaker in electrical communication with the receiving unit.

4. The device of claim 3 further comprising:
    means for selecting one frequency of electromagnetic waves received to be played through the at least one speaker.

5. The device of claim 1 further including:
    a pair of strap portions extending from opposite sides of the central portion substantially normal to each of the pair of attaching portions.

6. The band of claim 5 wherein each of the pair of strap portions has a plurality of apertures formed therein along the extent thereof.

7. The band of claim 5 wherein the central portion of the band has a width greater than the strap portions.

8. The band of claim 5 wherein the central portion of the band has a plurality of apertures formed therethrough, each of the plurality of apertures configured to receive a stud located on the receiver.

9. The band of claim 5 further including a pair of earpiece bands, each of the pair of earpiece bands being attached to a corresponding strap portion wherein each of the pair of earpiece bands comprises a speaker portion and an attaching portion attached thereto.

10. The band of claim 9 wherein the attaching portion of each of the pair of earpiece bands further comprises a plurality of studs attached thereto.

11. The band of claim 1 wherein each of the pair of attaching portions includes a plurality of apertures formed therethrough.

* * * * *